United States Patent [19]
Hahn et al.

[11] Patent Number: 6,028,162
[45] Date of Patent: Feb. 22, 2000

[54] ADHESION-PROMOTING ADDITIVE FOR COATINGS BASED ON THERMOPLASTIC POLYESTERS

[75] Inventors: Siegfried Hahn, Hennef; Rainer Spittka, Voerde, both of Germany

[73] Assignee: Huels Aktiengesellschaft, Marl, Germany

[21] Appl. No.: 09/137,138

[22] Filed: Aug. 20, 1998

[30] Foreign Application Priority Data

Aug. 20, 1997 [DE] Germany .................. 197 36 130

[51] Int. Cl.⁷ .................................................. C08G 64/00
[52] U.S. Cl. .................. 528/272; 428/411.1; 428/423.7; 524/492; 528/271
[58] Field of Search ...................... 528/271, 272; 428/411.1, 423.7; 524/492

[56] References Cited

U.S. PATENT DOCUMENTS

| 4,018,848 | 4/1977 | Khanna | 528/272 |
| 4,481,352 | 11/1984 | McConnell et al. | 528/272 |
| 5,807,954 | 9/1998 | Becker et al. | 528/25 |

*Primary Examiner*—Terressa Mosley-Boykin
*Attorney, Agent, or Firm*—Oblon, Spivak, McClelland, Maier & Neustadt, P.C.

[57] ABSTRACT

An epoxy resin-free coating system based on thermoplastic polyesters into which a polyester is incorporated as adhesion-promoting additive, which polyester is non-toxic.

10 Claims, No Drawings

ADHESION-PROMOTING ADDITIVE FOR COATINGS BASED ON THERMOPLASTIC POLYESTERS

BACKGROUND OF THE INVENTION

1. Field of the Invention

The present invention relates to an epoxy resin-free coating system based on thermoplastic polyesters. into which a polyester has been incorporated as an adhesion-promoting additive.

2. Description of the Related Art

On the basis of thermoplastic polyesters, coating materials have for a long time been produced and marketed for a very wide variety of applications. The common method of production entails incorporating the adjuvants required for the intended application, such as color pigments, fillers, stabilizers, leveling agents. luster agents and/or other additional and auxiliary substances, into the polyester on compounding extruders or kneading apparatus. The resulting compound can be applied as a solution, film, melt, powder or in some other form in the use envisaged.

A technique which is particularly suitable in practice is powder coating of metals by fluidized-bed sintering or by an electrostatic method. In the fluidized-bed sintering method, hot metal parts are coated by being dipped into an air-fluidized bed of the pulverulent coating material. In this procedure, thermoplastic melts onto the surface and, after cooling, forms a protective coating. In electrostatic coating, powder is sprayed by means of compressed air onto the metal part where it remains adherent through the application of high direct-current voltage. Subsequently, a coating is obtained likewise by melting in an oven or by using a gas flame, for example. The coating material can also be employed in another way, such as a melt or film, for example.

Despite the fact that the preparation of thermoplastic coating powders is relatively complex, due to use of a cold grinding operation with liquid nitrogen, it has been possible to maintain and even increase market share in the face of competition from wet coating materials and reactive systems. Environmental considerations are paramount since coating powders operate entirely without solvent. Additionally, purely thermoplastic coating materials have processing advantages over reactive systems since they are melted on purely through the supply of heat and cure by cooling. Because of this they are suitable, inter alia, for extremely rapid coating units operating with downstream further processing, for which reactive systems are generally too slow. By their very nature reactive systems require chemically reactive components and hardeners, which are often toxicologically objectionable. Moreover, a proportion of residual monomer remains in the coating after the reaction.

These are also the reasons why the use of thermoplastic systems is preferred in the weld seam protection of welded preserve cans. In the can, the can seam is reliably protected by thermoplastic polyesters against any ingredient, and hence preserves the contents unchanged.

The necessary coating properties, such as adhesion, elasticity and coating sterilizability, are not provided by the thermoplastic polyester alone. Marked improvements have only been obtained by the use of appropriate additives. Through such formulations properties have been optimized to the extent that coatings of thermoplastic polyesters can be attained having good service properties.

Adhesion promotion by the incorporation of epoxy resins as an additive into the thermoplastic polyesters is considered "state of the art". In this instance the epoxy resin is not—as is usually the case—chemically crosslinked but is merely mixed with the polyester, since the polyesters commonly employed do not possess any notable reactive groups. The activity of the epoxy resin additive in terms of the coating properties is excellent and therefore makes it possible to meet completely all requirements on the coating system.

When the coating system is employed in the food packaging sector, the relevant regulations must be met, such as FDA 175.300 (USA), Directive 90/128 (EU), etc. For such use, the thermoplastic systems, as already noted, have decisive advantages over other systems.

Recently, epoxy resins employed as a coating material in the food packaging sector have come under scrutiny. Traces of bisphenol A diglycidyl ether (BADGE) from epoxy resin coating materials leach out of the interior coatings of preserve cans and are taken up by humans upon consumption of the contents. In oil-containing fish cans, for example, impermissibly high concentrations have been measured of BADGE leach from the interior coating. BADGE is now suspected of having carcinogenic and estrogenic effects. Consequently, the Scientific Committee on Foods of the European Union in June 1996 undertook a toxicological reassessment of BADGE. Although there is no firm evidence of a carcinogenic effect to date, in November, 1996, the German Federal Institute for Consumer Health Protection and Veterinary Medicine called for reductions in food contamination. BADGE contents of more than 1 mg/kg are classified as objectionable on health grounds.

Customary thermoplastic coating systems include a small percentage of epoxy resin, in the formulation, which also includes a certain proportion of residual monomer (BADGE). Consequently, the thermoplastic polyester coating system, although fundamentally ecologically and toxicologically flawless, still provokes criticism due to the presence of epoxy resin therein.

SUMMARY OF THE INVENTION

Accordingly, it is an object of the present invention to provide an additive for a coating system, which additive is toxicologically unobjectionable and which, at the same time, affords properties at least as good as those obtained using the conventional epoxy resin additive.

Surprisingly, it has been discovered that certain polyesters as defined hereinbelow, as an additive to conventional thermoplastic polyesters. lead to coatings with equally good results and can, therefore, replace the epoxy resins. In particular, polyesters which still have a clear acid number are also suitable. This affords particularly good adhesion on metals.

This object and others are provided by a coating system based on thermoplastic polyesters, color pigments, fillers, leveling agents and further auxiliaries, wherein the coating system contains a polyester consisting of A) aliphatic or cycloaliphatic polybasic acids or both and aromatic-polybasic acids or ester-forming compounds thereof, or both;

B) aliphatic or cycloaliphatic polyfunctional alcohols, or both; and

C) optionally, hydroxy carboxylic acids or compounds thereof, or both having a molar mass of from about 500 to 20,000, in an amount of from about 0.5 to 15% by mass, based on the overall compound, as an adhesion-promoting additive.

DESCRIPTION OF THE PREFERRED EMBODIMENTS

The adhesion-promoting polyesters of the present invention are employed in amounts of from about 0.5 to 15% by mass, based on the overall compound. They are amorphous and have a molar mass of from about 500 to 20,000, preferably from about 1000 to 15,000, and consist of A) aliphatic and/or cycloaliphatic and aromatic polybasic acids and/or ester-forming derivatives thereof in combination with, B) aliphatic and/or cycloaliphatic polyfunctional alcohols and, if desired, C) hydroxy carboxylic acids and/or derivatives thereof.

The amorphous, adhesion-promoting polyester of the present invention preferably contains as an acid component at least one aromatic dicarboxylic acid, such as terephthalic acid, and at least one aliphatic polycarboxylic acid having 2 to 36 carbon atoms, such as adipic acid, or ester-forming derivatives thereof, such as dimethyl adipate. As the alcohol component it contains at least one linear 1,ω-diol having 2 to 36 carbon atoms, such as ethylene glycol or 1,4-butanediol, at least one further aliphatic diol having 3 to 36 carbon atoms, such as 1,2-propanediol or 1,3-butanediol, and, if desired, further polyfunctional alcohols, such as trimethylol propane.

The adhesion-promoting polyesters have a glass transition temperature of between 0 and about 70° C., preferably between about 20 and 60° C., and their viscosity number is >45 ml/g, preferably >50 ml/g.

As the thermoplastic base polyester in the coating materials according to the present invention use is made of a partially crystalline polyester having a viscosity number >60 ml/g, preferably >70 ml/g, a glass transition temperature between 0 and 50° C., preferably between 10 and 40° C. and a melting range between about 150 and 200° C., preferably between about 160 and 180° C.

The base polyester has as its acid component at least one aromatic dicarboxylic acid such as terephthalic acid, and at least one aliphatic dicarboxylic acid having 2 to 36 carbon atoms, or ester-forming derivatives thereof. On the diol side it contains preferably 1,4-butanediol and optionally one or more aliphatic diols having 2 to 36 carbon atoms.

The coating system of the present invention may as an additional component include a further polyester. This polyester is partially crystalline and contains as its acid component at least one aromatic dicarboxylic acid such as terephthalic acid, for example. and at least one aliphatic dicarboxylic acid having 2 to 36 carbon atoms, or ester-forming derivatives thereof. As for the diol component, the polyester contains 1,4-butanediol and optionally one or more aliphatic dials having 2 to 36 carbon atoms. The polyester is employed in amounts of from about 2 to 60% by mass, preferably from about 5 to 50% by mass and, with particular preference, from about 10 to 40% by mass, based on the overall compound. It has a viscosity number >60 ml/g, preferably >70 ml/g, a glass transition temperature of between about −50 and 0° C., preferably from about −40 to −10° C. and a melting range between about 140 and 200° C., preferably from about 145 to 170° C. This polyester gives the compound flexible properties and makes it particularly suitable for the coating of parts which subsequently undergo mechanical deformation.

The coating materials according to the invention can be used for a very wide variety of applications. One particular field of use is coating in the sector of food packaging. For this purpose the adjuvants required for the envisaged application, such as color pigments, fillers, stabilizers, leveling agents, luster agents and/or other additional and auxiliary substances, are incorporated into the polyester. The compound can then be applied as a solution, film, melt or powder or in another form in the intended field of use.

The present invention will now be further described by reference to certain Examples and Comparative Examples which are provided solely for purposes of illustration and are not intended to be limitative.

COMPARATIVE EXAMPLE 1

(Thermoplastic Polyester without Additive):

A thermoplastic polyester (according to DE-A 23 46 559) is processed to form a compound with the addition of 20% of titanium oxide and 0.5% of a leveling agent. This compound is subsequently cold-ground and sieved to produce a powder <85 $\mu$m. The powder is applied to metal panels about 0.4 mm thick by spraying with an electrostatic gun and is melted in an oven at 200° C. for 5 minutes.

The coating, which is approximately 60 $\mu$m thick, has the following properties:

adhesion: crosshatch GT 0, elasticity: Erichsen indentation >10 mm.

adhesion after hot water test: crosshatch GT 0, adhesion after acetic acid sterilization (3%): crosshatch GT 4, adhesion after lactic acid sterilization (2%): crosshatch GT 4.

Final assessment: the coating system loses its adhesion after acid attack and is of limited use in practice.

COMPARATIVE EXAMPLE 2

(Thernoplastic Polyester with Epoxy Resin Additive):

Coating powder (prepared as in Comparative Example 1) but with the addition of 5% of epoxy resin additive. As in Example 1, the powder was applied to metal panels about 0.4 mm thick by spraying with an electrostatic gun and was melted in an oven at 200° C. for 5 minutes.

The coating, which is approximately 60 $\mu$m thick, has the following properties: adhesion:

crosshatch GT 0, elasticity: Erichsen indentation >10 mm.

adhesion after hot water test: crosshatch GT 0, adhesion after acetic acid sterilization (3%): crosshatch GT 0, adhesion after lactic acid sterilization (2%): crosshatch GT 0.

EXAMPLE 1

(Thermoplastic Polyester with Addition of the Adhesion-Promoting Polyester Resin)

Coating powder (prepared as in Comparative Example 1) but with the addition of 3% of polyester resin having the following composition:

terephthalic acid isophthalic acid sebacic acid monoethylene glycol 1,4-butanediol 1,2-propanediol trimethylolpropane and the physical data below:

viscosity number about 60 ml/g glass transition temperature about 45° C.

OH number about 5 mg of KOH/g.

As in Comparative Example 1, the powder was applied to metal panels about 0.4 mm thick by spraying with an electrostatic gun and was melted in an oven at 200° C. for 5 minutes.

The coating, which is approximately 60 am thick, has the following properties:

adhesion: crosshatch GT 0, elasticity: Erichsen indentation >10 mm, adhesion after hot water test: crosshatch GT 0, adhesion after acetic acid sterilization (3%): crosshatch GT 0.

adhesion after lactic acid sterilization (2%): crosshatch GT 0.

Final assessment: the coating system is resistant to sterilization, adhesion is very good even after acid attack, and the system can be employed for all fields of use.

In Comparative Example 1, it is clear that even a thermoplastic polyester is unable to meet all requirements placed on a coating system. Comparative Example 2 utilizes the system currently employed in industry; however, this formulation may release BADGE.

Example 1 utilizes the adhesion-promoting polyesters according to the present invention. These adhesion-promoting polyesters offer a fully equivalent and complete replacement for epoxy resin and afford equally good service properties.

Having described the present invention, it will now be clear to one skilled in the art that many changes and modifications may be made to the above-described embodiments without departing from the spirit and the scope of the present invention.

What is claimed is:

1. An epoxy resin-free coating system comprising a base thermoplastic polyester, color pigment, filler, leveling agents and further customary auxiliaries, wherein the coating system further includes about 0.5 to 15% by wt. of an adhesion-promoting amorphous polyester prepared from a mixture consisting essentially of A) at least one aliphatic or cycloaliphatic polycarboxylic acid and at least one aromatic carboxylic acid or an ester-forming compound thereof;

B) at least one aliphatic or cycloaliphatic polyfunctional alcohol; and

C) optionally, a hydroxy carboxylic acid, said adhesion-promoting polyester having a molar mass of from about 500 to 20,000.

2. The coating system as claimed in claim 1, wherein said adhesion-promoting polyester has a glass transition temperature of between 0 and about 70° C. and a viscosity >45 ml/g.

3. The coating system as claimed in either claim 1, wherein said adhesion-promoting polyester has a glass transition temperature of between about 20 and 60° C. and a viscosity >50ml/g.

4. The coating system as claimed in claim 1, wherein said adhesion-promoting polyester is prepared from a mixture consisting essentially of A) at least one aromatic polybasic dicarboxylic acid and at least one aliphatic dicarboxylic acid having 2 to 36 carbon atoms and/or ester-forming derivative thereof, and B) at least one linear aliphatic diol having 2 to 36 carbon atoms and at least one further aliphatic polyol having 3 to 36 carbon atoms.

5. The coating system as claimed in claim 1, wherein the base polyester has a glass transition temperature of between 0 and about 50° C., a melting range of between about 150 and 200° C. and a viscosity number >60 ml/g.

6. The coating system as claimed in claim 1, wherein the base polyester has a glass transition temperature of between about 10 and 40° C., a melting range of between about 160 and 180° C. and a viscosity number >70 ml/g.

7. The coating system as claimed in claim 1, wherein the base polyester is prepared from a mixture consisting essentially of A) at least one aromatic polybasic dicarboxylic acid and at least one aliphatic dicarboxylic acid having 2 to 36 carbon atoms or an ester-forming compound thereof, or both; and B) 1,4-butanediol or 1,4-butanediol with one or more aliphatic diols having 2 to 36 carbon atoms.

8. The coating system as claimed in claim 1, wherein the coating system further includes 2% to 60% by wt. of a flexibilizing polyester prepared from a mixture consisting essentially of A) at least one aromatic dicarboxylic acid and at least one aliphatic dicarboxylic acid having 2 to 36 carbon atoms or an ester-forming compound thereof, or both; and B) 1,4-butanediol or 1,4-butanediol with one or more aliphatic diols having 2 to 36 carbon atoms having a glass transition temperature of between about −50 and 0° C., a melting range of between about 140 and 200° C. and a viscosity of >60 ml/g.

9. A method of coating food packaging, which comprises applying the coating system of claim 1 as a food packaging.

10. A packaged food product, the packaging thereon being made from the coating system of claim 1.

* * * * *